United States Patent

Spence

[15] 3,653,615

[45] Apr. 4, 1972

[54] AIRCRAFT NOSE OPENING MECHANISM

[72] Inventor: William G. Spence, 2372 Wilson Ave., Montreal, Quebec, Canada

[22] Filed: June 3, 1969

[21] Appl. No.: 829,908

[52] U.S. Cl. .............................. 244/137, 244/102, 244/118
[51] Int. Cl. ............................................................ B64d 9/00
[58] Field of Search ......................... 244/118, 137, 100, 102; 49/254

[56] References Cited

UNITED STATES PATENTS 2,584,500  2/1952  Riordan ................................. 49/254
3,335,981  8/1967  Pauli et al. ........................... 244/137

Primary Examiner—Milton Buchler
Assistant Examiner—Steven W. Weinrieb
Attorney—Pierre Lesperance

[57] ABSTRACT

An airplane preferably for carrying cargo, having a nose portion openable by a simple mechanism to fully uncover a front loading and unloading opening. The landing gear serves also to lock the nose portion in closed position.

3 Claims, 3 Drawing Figures

PATENTED APR 4 1972 3,653,615

INVENTOR
William George SPENCE
BY Pierre Lesperance
AGENT

AIRCRAFT NOSE OPENING MECHANISM

The present invention relates to aircraft and, more particularly, to cargo carrying aircraft having an openable nose to enable front loading and unloading of the aircraft to the full extent of the cross-sectional area of the inside of the fuselage.

The general object of the present invention resides in the provision of an improved mechanism for opening and closing the nose portion of the aircraft, said mechanism enabling the nose portion to clear the edge of the fuselage opening during pivotal opening movement of the nose.

Another object of the invention resides in the provision of a mechanism of the character described, which enables to pivot the nose portion into an open position in which it completely clears the fuselage loading opening.

Another object of the invention resides in the provision of mechanism of the character described, which takes up a minimum of space and constitutes therefore minimum obstruction in the aircraft fuselage loading opening and which yet may be completely disposed inside the fuselage and nose portion to eliminate any drag along the aircraft skin.

Another object of the present invention resides in the provision of an aircraft of the character described, in which the front landing gear serves also as locking means for the nose portion to lock said nose portion in closed position.

The foregoing and other objects of the present invention will become more apparent during the following disclosure and by referring to the drawings, in which.

Figure 1:
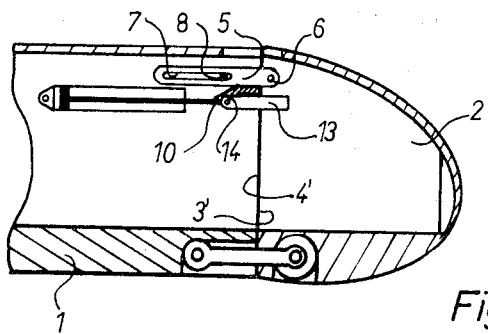
FIG. 1 is a longitudinal section of the front part of an aircraft showing the nose portion in closed position.

Referring now more particularly to the drawings in which like reference characters indicate like elements throughout, reference numeral 1 indicates the front portion of an aircraft fuselage provided with a nose 2, which is openable so as to completely uncover the full cross-section area of the front loading opening 3 of fuselage 1, such that merchandise and the like may be loaded into the fuselage through the front opening 3.

The nose 2 is open at 4 and its rear edge 4' is adapted to abut against the edge 3' of the fuselage opening 3 in the closed position of the nose so as to form a butt joint. This joint is provided with suitable means, not shown, to render the same airtight.

In accordance with the invention, elongated links 5 are pivotally connected at 6 to the nose 2 inside thereof in the top portion of the nose and in points substantially equally transversely distant from the median vertical plane of the aircraft, there being preferably two links 5. Each link 5 extends inwardly within the fuselage 1 and is provided with an elongated slot 7 receiving a pivot pin 8 rigidly secured to the fuselage 1 inside the latter near the top portion thereof. Each link 5 has therefore a sliding and pivotable connection with the fuselage.

The fuselage is provided with an abutment 10 having two angular faces adapted to contact the link 5 in its two pivoted limit positions.

Actuating means are provided to open and close the nose. These actuating means preferably consist in motor means, namely: a double acting hydraulic cylinder and piston unit 11 disposed below the respective links 5 and pivoted inside the fuselage at 12 and at 14 to a bar 13 which is rigidly secured to the nose 2 inside the same, said bar 13 protruding rearwardly from the edge 4' of the the nose.

The lower portion of the fuselage is provided with a locating pin 15 protruding from the edge 3' of the front opening 3 and adapted to enter a socket 16 formed in the edge 4' of the nose 2.

Several locating pins 15 may be arranged along the mating edges of the fuselage and nose.

Figure 2:
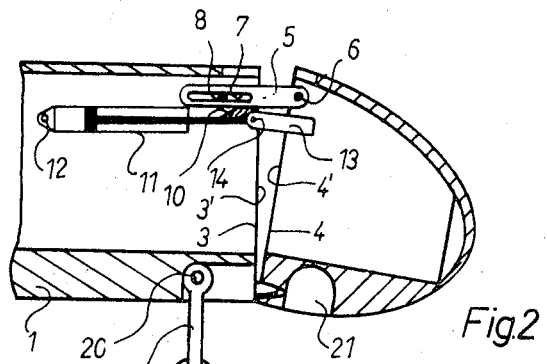
FIG. 2 is a similar longitudinal section showing the nose portion in partially open position.

The aircraft in accordance with the invention comprises a front landing gear, generally indicated at 17, and including a strut 18 carrying at its outer end a landing wheel 19 and pivoted at 20 to the fuselage 1, for movement in a vertical plane between a landing position, shown in FIG. 2, wherein the strut 18 is substantially perpendicular to the long axis of the fuselage and protrudes downwardly from the fuselage bottom portion, and a retracted position in which the strut 18 protrudes forwardly of the fuselage front opening 3 and enters a recess 21 in the bottom portion of the nose 2 with the wheel 19 entirely located within recess 21. Thus, the strut 18 serves also as means for firmly locking the nose in closed position on the fuselage 1.

Additional conventional locking means may be also provided along the butt joint between the nose and fuselage to lock the nose in firm closed position.

In the closed position of the nose, the links 5 are retracted within the fuselage with the pivot pins 8 close to the front ends of the slots 7 made in said links. The double-acting cylinder and piston units 11 are in retracted position.

To open the nose, the landing gear 17 must be in landing position, as shown in FIG. 2, to unlock the bottom portion of the nose. Operation of the cylinder and piston units 11 to extend the same, will first cause separation of the top portions of the nose and fuselage, whereby the nose will pivot substantially about its bottom edge, that is its edge remote from the links 5.

Figure 3:
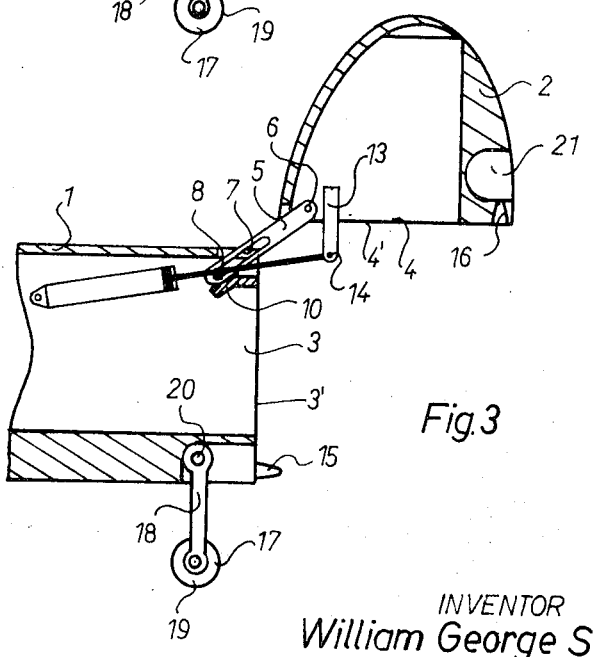
FIG. 3 is a similar longitudinal section showing the nose portion in fully open position.

As shown in FIG. 2, in this initial pivoting opening movement of the nose, the links 5 pivot slightly downwardly during their sliding forward movement with respect to the pivot pins 8 and, finally, come in engagement with the abutments 10 which prevent further downward pivotal movement of the links 5. The links simultaneously slide forwardly until the pivot pins 8 abut against the rear ends of slots 7. Further extension movement of the hydraulic cylinder and piston units 11 will then cause upward pivotal movement of the nose 2, with the links 5, which are now in their limit advanced position, pivoting upwardly about pivot pins 8 until the extensions 9 of the links 5 come into abutment with the stops 10. Thus, the links 5 can no longer pivot upwardly and further extension movement of the units 11 will cause full opening of the nose 2 until it reaches its fully open position shown in FIG. 3.

In this position, the nose is substantially at right angles to the fuselage and is disposed well above the top of the same, so as to clear completely the front opening 3 of the fuselage 1 for easy loading of the fuselage.

Release of the units 11 will initiate closing movement of the nose until it attains the position shown in FIG. 2 with the locating pins 15 engaging the sockets 16. Then, closing of the nose is completed by retracting power operation of the units 11.

Once the nose is closed, the conventional locking means are operated to firmly close the nose and then, once the aircraft is airborne, retraction of the landing gear 17 will provide additional locking means for maintaining the nose in closed position. The links 5 enable the nose top portion to clear the fuselage top portion at the butt joint during opening and closing movements of the nose.

What I claim is:

1. In an aircraft having a fuselage with a front opening and an openable nose forming a closure for said front opening, a mechanism for opening said nose, said fuselage having a downwardly opening landing gear mounting recess in the lower portion thereof, adjacent said opening, said nose having a bottom portion provided with an external outwardly opening wheel locking recess communicating with said landing gear mounting recess when said nose is in closed position against said fuselage, a landing gear including a landing wheel carrying strut pivotally mounted into said landing gear mounting recess and arranged to engage into both said recesses when the nose is closed and the landing gear is retracted, and a landing wheel carried by said strut and constructed and arranged to lockably engage into said external outwardly opening wheel locking recess and forming a lock with said external outwardly opening wheel locking recess arranged to hold said nose against said fuselage to close said opening.

2. In an aircraft as claimed in claim 1, wherein said mechanism includes links, each of said links has a sliding and pivotable connection with said fuselage and a pivotal connection with said nose, stop means is fixed on said fuselage and is arranged to be engaged by said links to limit pivoting movement thereof relative to said fuselage, extensible motor means pivotally connected to said fuselage and to said nose and constructed and arranged to displace said nose relative to said fuselage towards and away from said aperture.

3. In an aircraft as claimed in claim 2, wherein said extensible motor means are double-acting hydraulic cylinder and piston units.

* * * * *